(12) United States Patent
Kim et al.

(10) Patent No.: US 8,052,296 B2
(45) Date of Patent: Nov. 8, 2011

(54) BACKLIGHT ASSEMBLY AND DISPLAY DEVICE HAVING THE SAME

(75) Inventors: Chang-Hoi Kim, Seoul (KR); Jin-Soo Shin, Cheonan-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 297 days.

(21) Appl. No.: 12/469,095

(22) Filed: May 20, 2009

(65) Prior Publication Data
US 2009/0302780 A1 Dec. 10, 2009

(30) Foreign Application Priority Data
Jun. 5, 2008 (KR) .................................. 2008-52961

(51) Int. Cl.
*G09F 13/04* (2006.01)
(52) U.S. Cl. .................. 362/97.3; 362/221; 362/247
(58) Field of Classification Search .................. 362/97.1, 362/97.2, 97.3, 221, 225, 241, 247, 646
See application file for complete search history.

(56) References Cited

U.S. PATENT DOCUMENTS

| 7,566,154 | B2 * | 7/2009 | Gloisten et al. | 362/247 |
| 7,894,014 | B2 * | 2/2011 | Kawase et al. | 362/97.2 |
| 2006/0028836 | A1 * | 2/2006 | Shin et al. | 362/600 |
| 2007/0121320 | A1 * | 5/2007 | Arai et al. | 362/247 |
| 2009/0027584 | A1 * | 1/2009 | Han et al. | 362/225 |
| 2009/0097264 | A1 * | 4/2009 | Dunn | 362/373 |

FOREIGN PATENT DOCUMENTS

| JP | 2007-225781 | 9/2007 |
| KR | 1020070077610 | 7/2007 |
| KR | 1020070119453 | 12/2007 |

* cited by examiner

*Primary Examiner* — Y My Quach Lee
(74) *Attorney, Agent, or Firm* — F. Chau & Associates, LLC

(57) ABSTRACT

A backlight assembly includes a receiving container, a light-generating unit and a reflective sheet. The receiving container includes a bottom plate and a sidewall. The sidewall extends upwardly from an edge portion of the bottom plate to form a receiving space. The light-generating unit includes a light-emitting substrate disposed in the receiving space, light-emitting diodes (LEDs) and a driving circuit. The light-emitting substrate includes a light-emitting region and a peripheral region. The LEDs are disposed in the light-emitting region. The driving circuit disposed in the peripheral region controls the LEDs. The reflective sheet includes a center portion and a cover portion. The center portion is disposed on the light-emitting region. The cover portion is disposed on the peripheral region to cover the driving circuit.

18 Claims, 7 Drawing Sheets

BACKLIGHT ASSEMBLY AND DISPLAY DEVICE HAVING THE SAME

CROSS-REFERENCE TO RELATED APPLICATIONS

This application claims priority under 35 U.S.C. §119 to Korean Patent Application No. 2008-52961, filed on Jun. 5, 2008 in the Korean Intellectual Property Office (KIPO), the disclosure of which is incorporated by reference in its entirety herein.

BACKGROUND OF THE INVENTION

1. Technical Field

Embodiments of the present invention relate to a backlight assembly and a display device having the backlight assembly. More particularly, embodiments of the present invention relate to a backlight assembly including light-emitting diodes (LEDs) and a display device having the backlight assembly.

2. Discussion of Related Art

A liquid crystal display (LCD) device is typically thinner and uses less power as opposed to conventional cathode ray tube (CRT) display devices. Thus, LCD devices may be widely employed in monitors, notebook computers, mobile phones, large screen televisions, etc. An LCD device may include an LCD panel to display an image using light transmissivity of liquid crystal and a backlight assembly disposed under the LCD panel to provide the LCD panel with light.

An LCD panel may include an array substrate having a plurality of thin-film transistors (TFTs) disposed in a matrix shape, a color filter substrate facing the array substrate and a liquid crystal layer interposed between the array substrate and the color filter substrate.

The backlight assembly may employ cold cathode fluorescent lamps (CCFLs) as a light source. However, backlight assemblies employing a plurality of light-emitting diodes (LEDs) as a light source may use less power and may have higher color reproducibility. Such a backlight assembly may include a light-emitting substrate, LEDs disposed on the light-emitting substrate, and current balance devices.

The LEDs may be disposed in a light-emitting region of the light-emitting substrate and the current balance devices may be disposed in a peripheral region of the light-emitting substrate that is outside of the light-emitting region. The current balance devices control the LEDs to maintain current balance of currents applied to the LEDs.

Since the current balance devices do not generate light, the current balance devices can be covered. A side mold disposed on the peripheral region of the light-emitting substrate may be employed to cover the current balance devices. However, use of the side mold can increase the manufacturing cost of the backlight assembly. Thus, there is a need for a backlight assembly that does not require the side mold, and a display device having the backlight assembly.

SUMMARY OF THE INVENTION

An exemplary embodiment of the present invention includes a backlight assembly. The backlight assembly includes a receiving container, a light-generating unit and a reflective sheet. The receiving container includes a bottom plate and a sidewall upwardly extending from an edge portion of the bottom plate to form a receiving space. The light-generating unit includes a light-emitting substrate, a plurality of light-emitting diodes (LEDs) and a driving circuit. The light-emitting substrate may be disposed in the receiving space and include a light-emitting region and a peripheral region disposed outside of the light-emitting region. The light-emitting region may be disposed on an upper surface of the light-emitting substrate. The LEDs may be disposed in the light-emitting region. The driving circuit may be disposed in the peripheral region and control the LEDs. The reflective sheet includes a center portion and a peripheral region. The center portion may be disposed on the light-emitting region and include a plurality of holes through which the LEDs respectively pass. The cover portion may be disposed on the peripheral region to cover the driving circuit. The cover portion may be attached to the sidewall.

The cover portion may be outwardly inclined with respect to the bottom plate. The sidewall may include a side part and an upper part. The side part may upwardly extend from the edge portion of the bottom plate. The upper part may inwardly extend from an edge of the side part with respect to the receiving space. The cover portion may be attached to the upper part. The upper part may cover at least a portion of the driving circuit.

Alternatively, the cover portion may be attached to an inner side surface of the sidewall. Alternatively, the upper part may outwardly extend from an edge of the side part with respect to the receiving space. The cover portion may extend from an end of the center portion. Alternatively, the cover portion may be separated from the center portion and attached to the upper surface of the light-emitting substrate. The cover portion may include a metal to reflect light and have a fixed shape.

The bottom plate may have a substantially rectangular plate shape. The sidewall may include first to fourth sidewalls respectively corresponding to first to fourth sides of the bottom plate. The cover portion may include first to fourth cover portions respectively corresponding to the first to fourth sidewalls.

The driving circuit may be disposed in the peripheral region adjacent to at least one of the first to fourth sidewalls, and at least one of the first to fourth cover portions corresponding to the at least one of the first to fourth sidewalls may be disposed over the peripheral region to cover the driving circuit.

The driving circuit may be disposed in the peripheral region and electrically connected to the LEDs. The driving circuit may include a current balancer controlling the LEDs to maintain current balance of currents applied to the LEDs.

The backlight assembly may further include a control unit electrically connected to the driving circuit to control the driving circuit. The driving circuit may further include an inner connector disposed in the peripheral region and electrically connected to the control unit by a connecting line. The sidewall may include a through-hole through which the connecting line passes.

Another exemplary embodiment of the present invention includes a display device. The display device includes a display panel and a backlight assembly. The display panel may display an image using light. The backlight assembly may be disposed under the display panel to provide the display panel with the light. The backlight assembly may include a receiving container, a light-generating unit and a reflective sheet. The receiving container may include a bottom plate and a sidewall upwardly extending from an edge portion of the bottom plate to form a receiving space. The light-generating unit may include a light-emitting substrate, a plurality of LEDs and a driving circuit. The light-emitting substrate may be disposed in the receiving space and include a light-emitting region and a peripheral region disposed outside of the light-emitting region. The light-emitting region may be disposed on an upper surface of the light-emitting substrate. The LEDs may be disposed in the light-emitting region. The driving circuit may be disposed in the peripheral region and control the LEDs. The reflective sheet may include a center portion and a cover portion. The center portion may be disposed on the light-emitting region and include a plurality of holes through which the LEDs respectively pass. The cover portion may be disposed on the peripheral region to cover the driving circuit. The cover portion may be attached to the sidewall.

The display device may further include an optical member disposed between the display panel and the backlight assembly to improve optical properties of the light generated by the backlight assembly. The receiving container may further include at least one fixing protrusion protruding from an upper surface of the sidewall to fix the optical member supported by the upper surface of the sidewall.

The cover portion may be outwardly inclined with respect to the bottom plate. The sidewall may include a side part and an upper part. The side part may upwardly extend from the edge portion of the bottom plate. The upper part may inwardly extend from an edge of the side part with respect to the receiving space. The cover portion may be attached to the upper part.

BRIEF DESCRIPTION OF THE DRAWINGS

The embodiments of the present invention will become more readily apparent by reference to the following detailed description when considered in conjunction with the accompanying drawings wherein.

DETAILED DESCRIPTION OF EXEMPLARY EMBODIMENTS

The present invention is described more fully hereinafter with reference to the accompanying drawings, in which exemplary embodiments of the present invention are shown. The present invention may, however, be embodied in many different forms and should not be construed as limited to the exemplary embodiments set forth herein. It will be understood that when an element or layer is referred to as being "on," "connected to" or "coupled to" another element or layer, it can be directly on, connected or coupled to the other element or layer or intervening elements or layers may be present. Like numerals may refer to like elements throughout. Hereinafter, exemplary embodiments of the present invention will be explained in detail with reference to the accompanying drawings.

Figure 1:
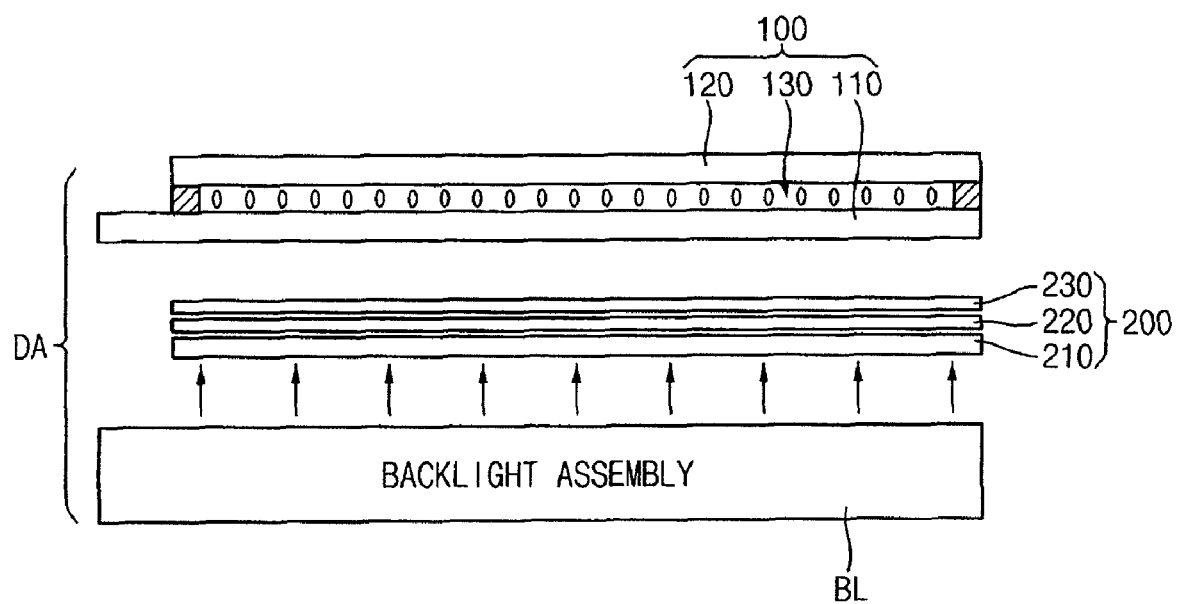
FIG. 1 is a cross-sectional view illustrating a display device in accordance with an exemplary embodiment of the present invention.

FIG. 1 is a cross-sectional view illustrating a display device according to an exemplary embodiment of the present invention. Referring to FIG. 1, a display device DA includes a display panel 100, a backlight assembly BL and an optical member 200. The display panel 100 displays an image using light. For example, the display panel 100 may include a first substrate 110, a second substrate 120 and a liquid crystal layer 130.

The first substrate 110 may include a plurality of signal lines, a plurality of thin-film transistors (TFTs) electrically connected to the signal lines, and a plurality of pixel electrodes electrically connected to the TFTs.

The second substrate 120 is opposite to the first substrate 110. The second substrate 120 may include a plurality of color filters respectively corresponding to the pixel electrodes and a common electrode. The common electrode may be disposed on an entire surface of the second substrate 120. Alternatively, the first substrate 110 may include the color filters.

The liquid crystal layer 130 is disposed between the first substrate 110 and the second substrate 120. An arrangement of liquid crystal molecules in the liquid crystal layer 130 may be changed based on an electric field between the pixel electrodes and the common electrode, so that an amount of light passing through the liquid crystal layer 130 may be changed.

The backlight assembly BL may be disposed under the display panel 100 and provides the display panel 100 with the light. The optical member 200 may be disposed between the backlight assembly BL and the display panel 100. The optical member 200 may improve properties of the light generated by the backlight assembly BL.

The optical member 200 may include a diffusing plate 210, a first prism sheet 220 and a second prism sheet 230. The diffusing plate 210 may improve brightness uniformity of the light generated by the backlight assembly BL. The first and second prism sheets 220 and 230 may improve a front brightness of the light generated by the backlight assembly BL.

Figure 2:
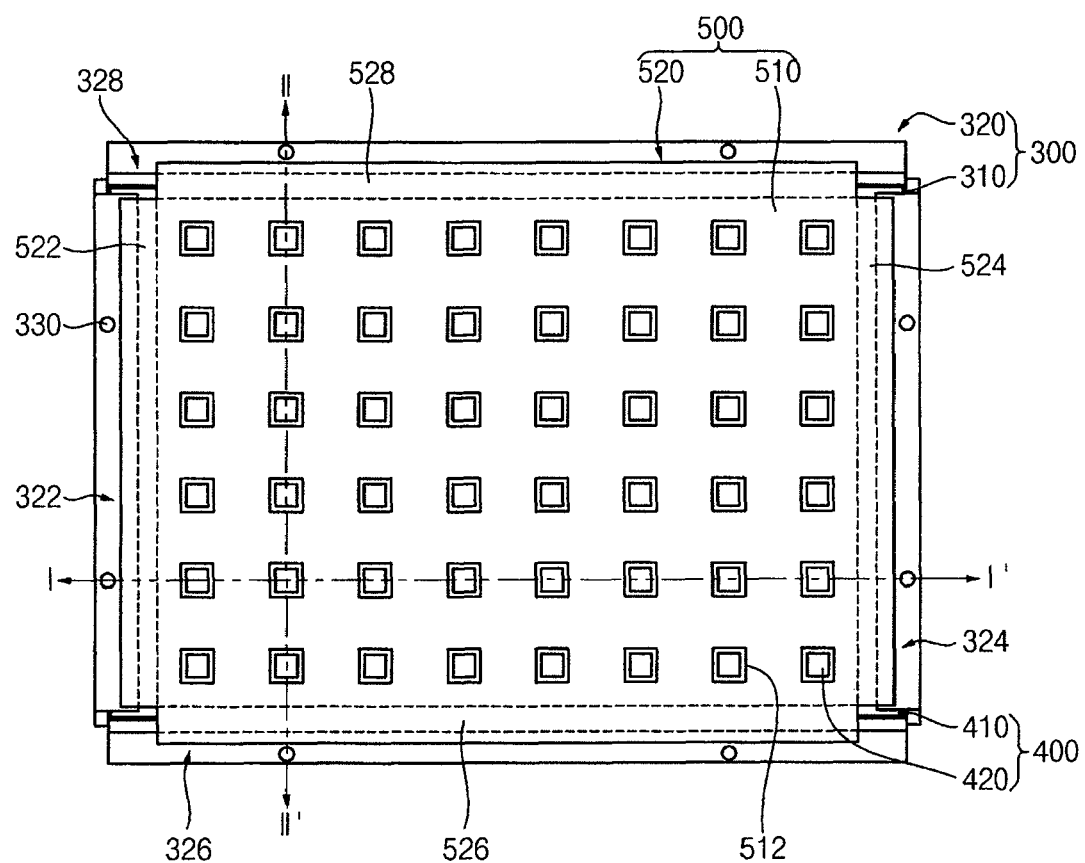
FIG. 2 is a plan view illustrating a backlight assembly illustrated in FIG. 1.
Figure 3:
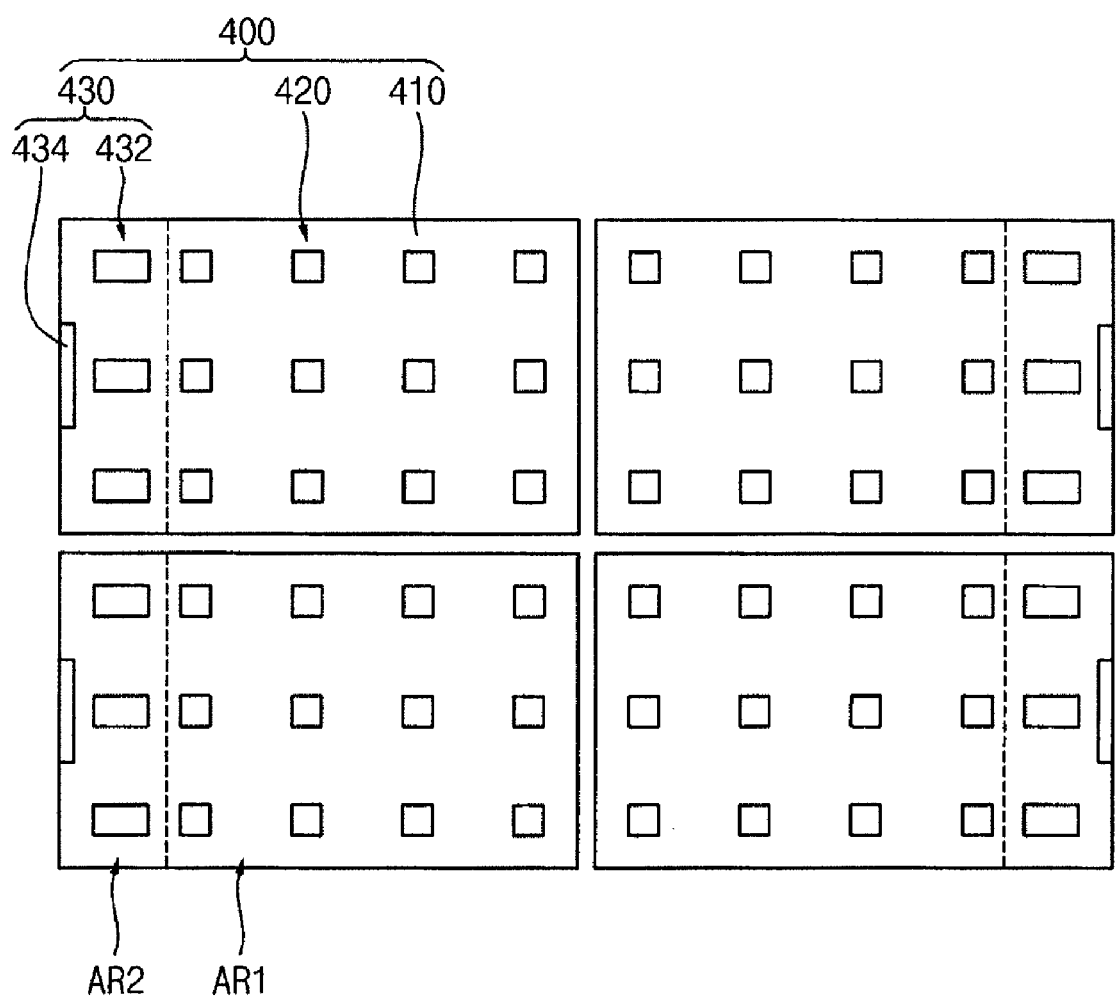
FIG. 3 is a plan view illustrating light-generating units illustrated in FIG. 2.
Figure 4:
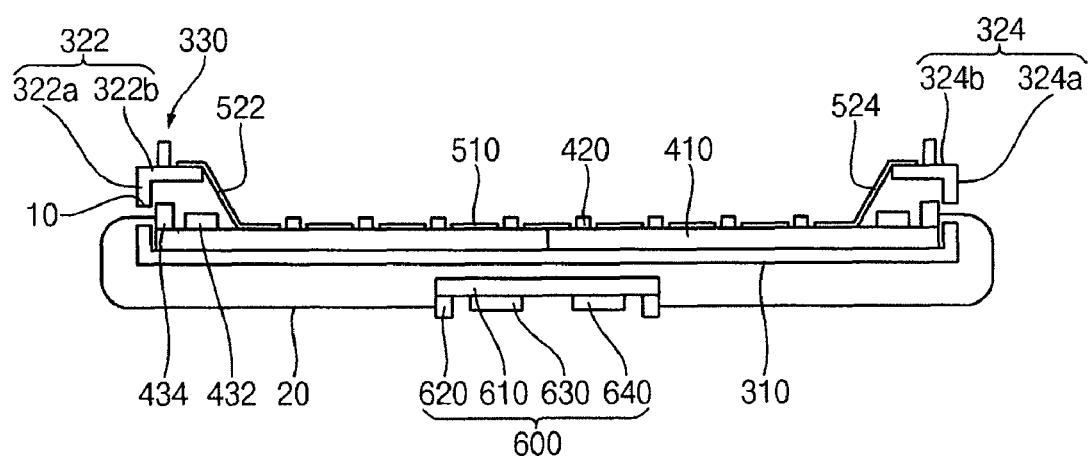
FIG. 4 is a cross-sectional view taken along a line I-I' shown in FIG. 2.
Figure 5:
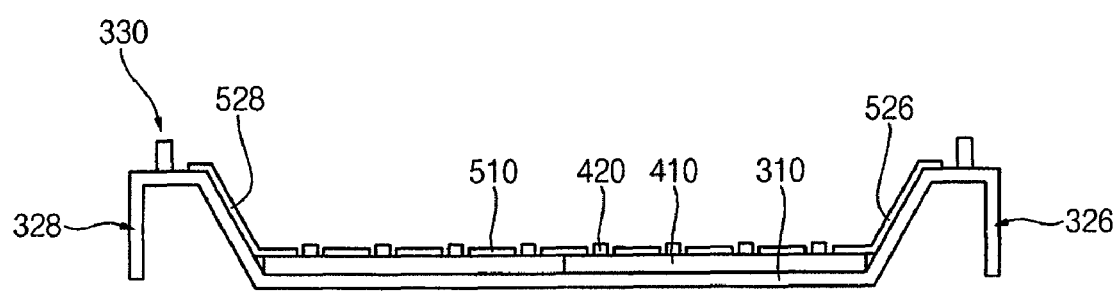
FIG. 5 is a cross-sectional view taken along a line II-II' shown in FIG. 2.

FIG. 2 is a plan view illustrating a backlight assembly illustrated in FIG. 1. FIG. 3 is a plan view illustrating light-generating units illustrated in FIG. 2. FIG. 4 is a cross-sectional view taken along a line I-I' shown in FIG. 2. FIG. 5 is a cross-sectional view taken along a line II-II' shown in FIG. 2.

Referring to FIGS. 2 to 5, the backlight assembly BL may include a receiving container 300, at least one light-generating unit 400, a reflective sheet 500, and a control unit 600. The receiving container 300 includes a bottom plate 310 and sidewalls 320 upwardly extending from edges of the bottom plate 310 to form a receiving space. For example, the receiving container 300 may be a bottom chassis.

The bottom plate 310 may have a rectangular shape including a first side, a second side, a third side, and fourth side. The bottom plate 310 may have a first edge, a second edge, a third edge, and a fourth edge which respectively correspond to the first side, the second side, the third side, and the fourth side. The bottom plate 310 may have a rectangular shape, which may have a length along a first direction DI1 and a width along a second direction DI2 substantially perpendicular to the first direction DI1. The length may be larger than the width.

The sidewalls 320 may include first to fourth sidewalls 322, 324, 326, and 328, which upwardly extend from the first to fourth edges of the bottom plate 310, respectively. The first and second sidewalls 322 and 324 may extend in the first direction DI1. The first and second sidewalls 322 and 324 are opposite to each other. The third and fourth sidewalls 326 and 328 may extend in the second direction DI2. The third and fourth sidewalls 326 and 328 are opposite to each other.

At least one sidewall of the first to fourth sidewalls 322, 324, 326, and 328 may have a cross-section of a substantially 'L' shape and the remaining sidewalls of the first to fourth sidewalls 322, 324, 326, and 328 may have a cross-section of a substantially 'U' shape. For example, as illustrated in FIGS. 4 and 5, the first and second sidewalls 322 and 324 may have the cross-section of the substantially 'L' shape, and the third and fourth sidewalls 326 and 328 may have the cross-section of the substantially 'U' shape.

The first sidewall 322 having the cross-section of the substantially 'L' shape may include a first side part 322a and a first upper part 322b. The first side part 322a may upwardly extend from the first edge of the bottom plate 310. The first upper part 322b may inwardly extend from an upper edge of the first side part 322a with respect to the receiving space.

The second sidewall 324 having the cross-section of the substantially 'L' shape may include a second side part 324a and a second upper part 324b. The second side part 324a may upwardly extend from the second edge of the bottom plate 310. The second upper part 324b may inwardly extend from an upper edge of the second side part 324a with respect to the receiving space.

The third sidewall 326 may include a first inclined part extending from the third edge of the bottom plate 310 and the fourth sidewall 328 may include a second inclined part extending from the fourth edge of the bottom plate 310. The inclined parts may be inclined with respect to the bottom plate 310 and may outwardly extend with respect to the receiving space.

The optical member 200 may be disposed on upper surfaces of the first to fourth sidewalls 322, 324, 326, and 328. The receiving container 300 may further include at least one fixing protrusion 330 protruding from the upper surfaces of the first to fourth sidewalls 322, 324, 326, and 328. The fixing protrusion 330 may prevent a horizontal movement of the optical member 200.

The light-generating unit 400 is disposed in the receiving space of the receiving container 300. The light-generating unit 400 may include a light-emitting substrate 410, a plurality of light-emitting diodes (LEDs) 420 and a driving circuit 430. For example, as illustrated in FIG. 3, four light-generating units 400 may be arranged in a 2-by-2 matrix shape.

The light-emitting substrate 410 may be disposed on the bottom plate 310 of the receiving container 300. The light-emitting substrate 410 may include a lower surface facing the bottom plate 310 and an upper surface opposite to the lower surface. The upper surface of the light-emitting substrate 410 may include a light-emitting region AR1 from which light is emitted and a peripheral region AR2 disposed outside of the light-emitting region AR1.

The LEDs 420 may be disposed in the light-emitting region AR1. The LEDs 420 may include red LEDs, green LEDs and blue LEDs. Alternatively, the LEDs may include white LEDs.

The driving circuit 430 may be disposed in the peripheral region AR2. The driving circuit 430 is electrically connected to the LEDs 420 and controls the LEDs 420. For example, the driving circuit 430 may control the LEDs 420 so that the LEDs 420 may generate light.

The driving circuit 420 may include a current balancer 432 and an inner connector 434. The current balancer 432 may be disposed in the peripheral region AR2. The current balancer 432 may be electrically connected to the LEDs 420 and control the LEDs to maintain current balance of currents applied to the LEDs 420. The inner connector 434 may be disposed in the peripheral region AR2. The inner connector 434 may be electrically connected to the LEDs 420 and the current balancer 432.

Although a backlight assembly BL including four light-generating units 400 separated from one another has been described above, the backlight assembly BL may include a varying number of light-generating units or a single integrated light-generating unit. For example, the backlight assembly BL may include an integrated light-emitting substrate corresponding to four light-emitting substrates connected to one another, which may be disposed on the bottom plate 310 of the receiving container 300.

An upper surface of the integrated light-emitting substrate may include a light-emitting region AR1 from which the light is emitted and a peripheral region AR2 disposed outside of the light-emitting region AR1. The peripheral region AR2 may be adjacent to at least one of the first to fourth sidewalls 322, 324, 326, and 328. The driving circuit 430 may be disposed in the peripheral region AR2. For example, the upper surface of the integrated light-emitting substrate may include a first peripheral region that is adjacent to the first sidewall 322, a second peripheral region that is adjacent to the second sidewall 324 and the light-emitting region AR1 disposed between the first peripheral region and the second peripheral region, and the driving circuits 430 may be disposed in the first and second peripheral regions AR2, respectively.

The sidewalls 320 may include a through-hole 10 to expose the inner connector 434. For example, as illustrated in FIG. 4, each of the first and second sidewalls 322 and 324 may include the through-hole 10.

The reflective sheet 500 may be disposed on the upper surface of the light-emitting substrate 410 and reflect light generated by the LEDs 420. For example, the reflective sheet 500 may be attached to the upper surface of the light-emitting substrate 410 by an adhesive.

The reflective sheet 500 may include a center portion 510 and a cover portion 520 extending from an edge of the center portion 510. The center portion 510 may be disposed in the light-emitting region AR1 of the upper surface of the light-emitting substrate 410. The center portion 510 may include a plurality of holes 512 through which the LEDs 420 respectively pass.

The cover portion 520 may extend from the end of the center portion 510 and be disposed over the peripheral region AR2 of the upper surface of the light-emitting substrate 410 to cover the driving circuit 430. The cover portion 520 may include a first cover portion 522 corresponding to the first sidewall 322, a second cover portion 524 corresponding to the second sidewall 324, a third cover portion 526 corresponding to the third sidewall 326, and a fourth cover portion 528 corresponding to the fourth sidewall 328.

The first cover portion 522 may extend from a first end of the center portion 510 and include a first end that is attached to the upper surface of the light-emitting substrate 410 and a second end that is attached to the upper surface of the first upper part 322b of the first sidewall 322. Alternatively, the second end of the first cover portion 522 may be attached to a lower surface of the first upper part 322b of the first sidewall 322. Thus, the first cover portion 522 may cover the driving circuit 430 disposed at the second peripheral region AR2 of the upper surface of the light-emitting substrate 410.

The first cover portion 522 may be outwardly inclined with respect to the bottom plate 310 to improve the reflective efficiency of the light generated by the LEDs 420. The first upper part 322b may inwardly extend from the upper end of the first side part 322a to cover the driving circuit 430 disposed at the first peripheral region AR2.

The second cover portion 524 may extend from a second end of the center portion 510, which is opposite to the first end of the center portion 510. The second cover portion 524 may have a structure and a function that are substantially similar to or substantially the same as those of the first cover portion 522, except that the second cover portion may be disposed over the second peripheral region AR2. Thus, any repetitive explanation of the second cover portion 524 will be omitted.

The third cover portion 526 may extend from a third end of the center portion 510. The third cover portion 526 may be disposed on the first inclined part of the third sidewall 326. The fourth cover portion 528 may extend from a fourth end of the center portion 510, which is opposite to the third end of the center portion 510. The fourth cover portion 528 may be disposed on the second inclined part of the fourth sidewall 328.

Figure 6:
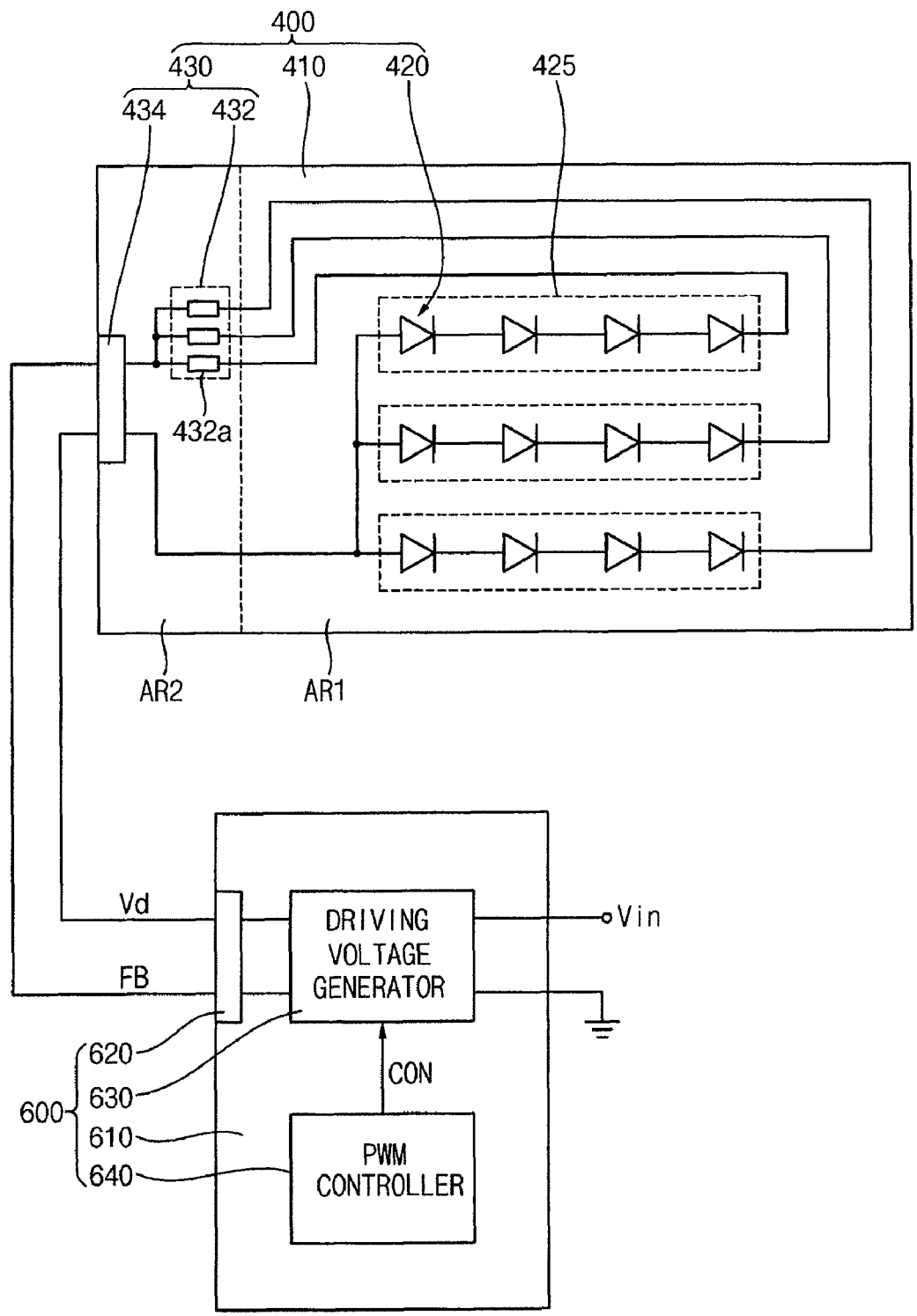
FIG. 6 is a plan view illustrating an electrical connection between light-generating units and a control unit in the backlight assembly illustrated in FIG. 2.

FIG. 6 is a plan view illustrating an electrical connection between light-generating units and a control unit in the backlight assembly illustrated in FIG. 2 according to an exemplary embodiment of the present invention. Referring to FIGS. 4 and 6, the LEDs 420 may include a plurality of LED strings 425. For example, as illustrated on FIG. 6, three LED strings may be disposed in the light-emitting region AR1 of the upper surface of the light-emitting substrate 410.

The current balancer 432 may include a plurality of current balance devices 432 respectively connected to the LED strings 425. For example, each of the current balance devices 432 may include at least one transistor for maintaining the balance of the current applied to a corresponding LED string 425.

The inner connector 434 may be electrically connected to the current balance devices 432 and the LED strings 425. The inner connector 434 may be electrically connected to the control unit 600 by a connecting line 20 passing through the through-hole 10.

The control unit 600 may be disposed on a rear surface of the bottom plate 310. The control unit 600 may include a control substrate 610, an outer connector 620, a driving voltage generator 630, and a pulse width modulation (PWM) controller 640.

The control substrate 610 may be disposed on the rear surface of the bottom plate 310. The outer connector 620 may be disposed on a surface of the control substrate 610. The outer connector 620 may be electrically connected to the inner connector 434 by the connecting line 20.

The driving voltage generator 630 may be disposed on the surface of the control substrate 610. The driving voltage generator 630 may be electrically connected to the outer connector 620. The driving voltage generator 630 may receive an input voltage Vin and a ground voltage from an external device (not shown) and output a driving voltage Vd using the input voltage Vin. The driving voltage generator 630 may raise the input voltage Vin to generate the driving voltage Vd. For example, the input voltage Vin may be a DC voltage of about 5 volts and the driving voltage Vd may be a DC voltage of about 24 volts.

The PWM controller 640 may be disposed on the surface of the control substrate 610 and electrically connected to the driving voltage generator 630. The PWM controller 640 may provide the driving voltage generator 630 with a PWM control signal CON for driving the LED strings in a local dimming method. The driving voltage generator 630 may output the driving voltage Vd to drive the LED strings 425 in the local dimming method in response to the PWM control signal CON.

The driving voltage Vd may be applied to the LED strings 425 via the outer connector 620 and the inner connector 434.

A feedback signal FB may be applied to the driving voltage generator 630 via the outer connector 620 and the inner connector 434. The feedback signal FB may be generated by the current balance devices 432, which are electrically connected to the LED strings 425. The driving voltage generator 630 may control a voltage or a current applied to the LED strings 425 using the feedback signal FB.

The driving voltage generator 630 and the PWM controller 640 may be disposed on a surface of a control substrate 610. Alternatively, the driving voltage generator 630 and the PWM controller 640 may be respectively disposed on surface of two separated control substrates.

According to at least one embodiment of the present invention, the cover portion 520 may be attached to the upper surface of the upper part of a sidewall 520 and the upper surface of the bottom plate 310 to cover the driving circuit 430 disposed in the peripheral region AR2 of the upper surface of the light-emitting substrate 410. Therefore, the backlight assembly may not need a side mold to cover the driving circuit 430 and the manufacturing cost may be reduced.

Figure 7:
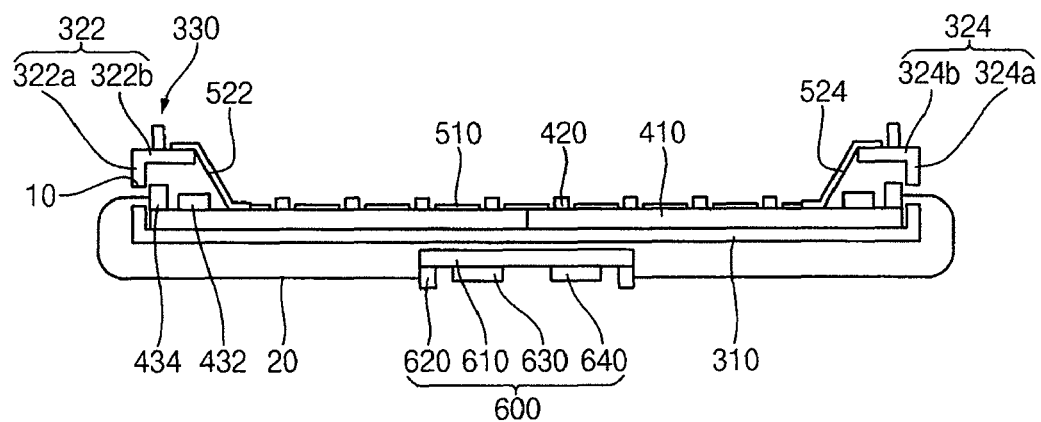
FIG. 7 is a cross-sectional view illustrating a backlight assembly of a display device according to another exemplary embodiment of the present invention.

FIG. 7 is a cross-sectional view illustrating a backlight assembly of a display device according to another exemplary embodiment of the present invention. The display device has a structure and a function substantially similar to or substantially the same as the display device illustrated in FIGS. 1 to 6, except for a cover portion of a reflective sheet. Thus, the same or similar components will be referred to using the same reference numerals and any repetitive explanation will be omitted.

Referring to FIGS. 2 and 7, the cover portion 520 may be separated from the center portion 510. The cover portion 520 may be disposed over the peripheral region AR2 of the upper surface of the light-emitting substrate 410 to cover the driving circuit 430.

The cover portion may include a first cover portion 522 corresponding to the first sidewall 322, a second cover portion 524 corresponding to the second sidewall 324, a third cover portion 526 corresponding to the third sidewall 326, and a fourth cover portion 528 corresponding to the fourth sidewall 328. At least one of the first to fourth cover portions 522, 524, 526, and 528 may be separated from the center portion 510 and the remaining cover portions may be integrated with the center portion 510. For example, the first and second cover portions 522 and 524 may be separated from the center portion 510 and the third and fourth cover portions 526 and 528 may be integrated with the center portion 510.

The first cover portion 522 may be separated from the first end of the center portion 510 and include one end that is attached to the upper surface of the light-emitting substrate 410 and another end that is attached to the upper surface of the first upper part 322b of the first sidewall 322. Alternatively, the first cover portion 522 may include one end that is attached to the upper surface of the light-emitting substrate 410 and another end that is attached to the lower surface of the first upper part 322b of the first sidewall 322. The first cover portion 522 may cover the driving circuit 430 disposed at the first peripheral region AR2 of the upper surface of the light-emitting substrate 410.

The first cover portion 522 may be outwardly inclined with respect to the bottom plate 310 to improve the reflective efficiency of the light generated by the LEDs 420. The first upper part 322b of the first sidewall 322 may extend from the upper end of the first side part 322a of the first sidewall 322 to cover the driving circuit 430.

The second cover portion 524 may be separated from the second end of the center portion 510 which is opposite to the first end of the center portion 510. The second cover portion 524 may have a structure and a function that are substantially similar to or substantially the same as the first cover portion 522, except that the second cover portion 524 may be disposed over the second peripheral region AR2. Thus, any repetitive explanation concerning the second cover portion 524 will be omitted.

The third cover portion 526 may extend from the third end of the center portion 510. The third cover portion 526 may be disposed on the first inclined part of the third sidewall 326. The fourth cover portion 528 may extend from the fourth end of the center portion 510, which is opposite to the third end of the center portion 510. The fourth cover portion 528 may be disposed on the second inclined part of the fourth sidewall 328. The first and second cover portions 522 and 524, which are separated from the center portion 510 may be formed of a metal to have high reflectivity and a fixed shape.

According to at least embodiment of the present invention, the cover portion separated from the center portion 510 may be disposed over the peripheral region AR2 to cover the driving circuit 430. Therefore, the backlight assembly may not require a side mold for covering the driving circuit 430 and the manufacturing cost of the backlight assembly may be reduced.

In addition, since the cover portion is separated from the center portion 510, the cover portion may be disposed at an above-mentioned position after the center portion 510 is disposed on the upper surface of the light-emitting substrate. Therefore, the reflective sheet may be easily disposed at a predetermined position. Also, when the cover portion is formed of a metal of a fixed shape, the reflective sheet may be more easily disposed at the predetermined position.

Figure 8:
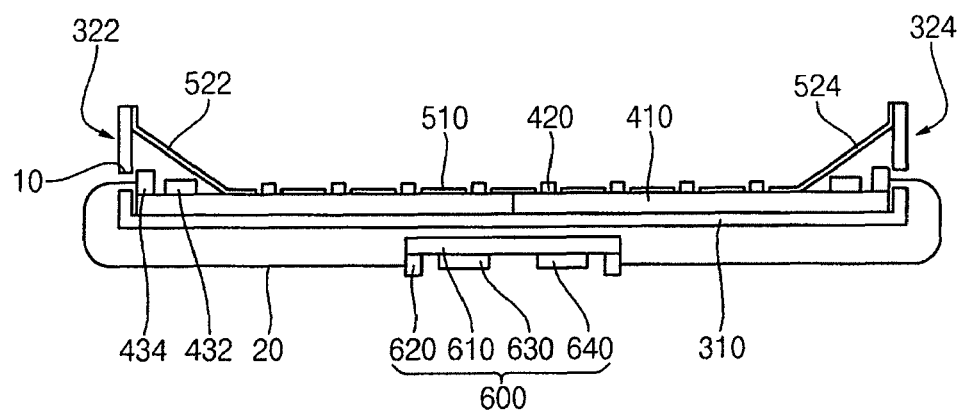
FIG. 8 is a cross-sectional view illustrating a backlight assembly of a display device according to a further exemplary embodiment of the present invention.

FIG. 8 is a cross-sectional view illustrating a backlight assembly of a display device according to a further exemplary embodiment of the present invention. The display device may have a structure and a function, which are substantially similar to or substantially the same the display device illustrated in FIGS. 1 to 6, except for sidewalls of a receiving container and a cover portion of a reflective sheet. Thus, the same or similar components will be referred to using the same reference numerals and any repetitive explanation will be omitted.

Referring to FIGS. 2 and 8, the sidewalls 320 may include a first sidewall 322 upwardly extending from the first end of the bottom plate 310, a second sidewall 324 upwardly extending from the second end of the bottom plate 310, a third sidewall 326 upwardly extending from the third end of the bottom plate 310, and a fourth sidewall 328 upwardly extending from the fourth end of the bottom plate 310.

The first and second sidewalls 322 and 324 may extend in the first direction DI1 and be opposite to each other. The third and fourth sidewalls 326 and 328 may extend in the second direction DI2 and be opposite to each other. At least one of the first to fourth sidewalls 322, 324, 326, and 328 may have a cross-section of a substantially straight line shape. For example, the first and second sidewalls 322 and 324 may have the cross-section of the substantially straight line shape and the third and fourth sidewalls 326 and 328 may have the cross-section of the substantially 'U' shape. For example, alternatively, the first to fourth sidewalls 322, 324, 326, and 328 may have the cross-section of the substantially straight line shape.

The cover portion 520 may extend from an end portion of the center portion 510. The cover portion 520 may be disposed over the peripheral region AR2 of the upper surface of the light-emitting substrate 410. The cover portion 520 may include a first cover portion 522 corresponding to the first sidewall 322, a second cover portion 524 corresponding to the second sidewall 324, a third cover portion 526 corresponding to the third sidewall 326, and a fourth cover portion 528 corresponding to the fourth sidewall 328.

The first cover portion 522 may extend from the first end of the center portion 510 and include one end that is attached to the light-emitting region of the upper surface of the light-emitting substrate 410 and another end that is attached to an inner side surface of the first sidewall 322. Thus, the first cover portion 522 may cover the driving circuit 430 that is disposed at the first peripheral region AR2 of the upper surface of the light-emitting substrate 410. The first cover portion 522 may be outwardly inclined with respect to the bottom plate 310 to improve the reflective efficiency of the light generated by the LEDs 420.

The second cover portion 524 may extend from the second end of the center portion 510 which is opposite to the first end of the center portion 510. The second cover portion 524 may have a structure and a function that are substantially similar to or substantially the same as the first cover portion 522, except that the second cover portion 524 may be disposed over the second peripheral region AR2. Thus, any repetitive explanation concerning the second cover portion 524 will be omitted.

The third cover portion 526 may extend from the third end of the center portion 510. The third cover portion 526 may include one end that is attached to the upper surface of the light-emitting substrate 410 and another end that is attached to an inner side surface of the third sidewall 326. The fourth cover portion 528 may extend from the fourth end of the center portion 510, which is opposite to the third end of the center portion 510. The fourth cover portion 528 may include one end that is attached to the upper surface of the light-emitting substrate 410 and another end that is attached to an inner side surface of the fourth sidewall 328.

The upper surface of the light-emitting substrate 410 may further include a third peripheral region adjacent to the third sidewall 326 or a fourth peripheral region adjacent to the fourth sidewall 328. The third and fourth cover portions 526 and 528 may cover the driving circuits 430 disposed at the third and fourth peripheral regions.

According to at least one exemplary embodiment of the present invention, the cover portion may be disposed over the peripheral region to cover the driving circuit 430. Therefore, the backlight assembly may not need a side mold to cover the driving circuit and the manufacturing cost of the backlight assembly may be reduced.

Figure 9:
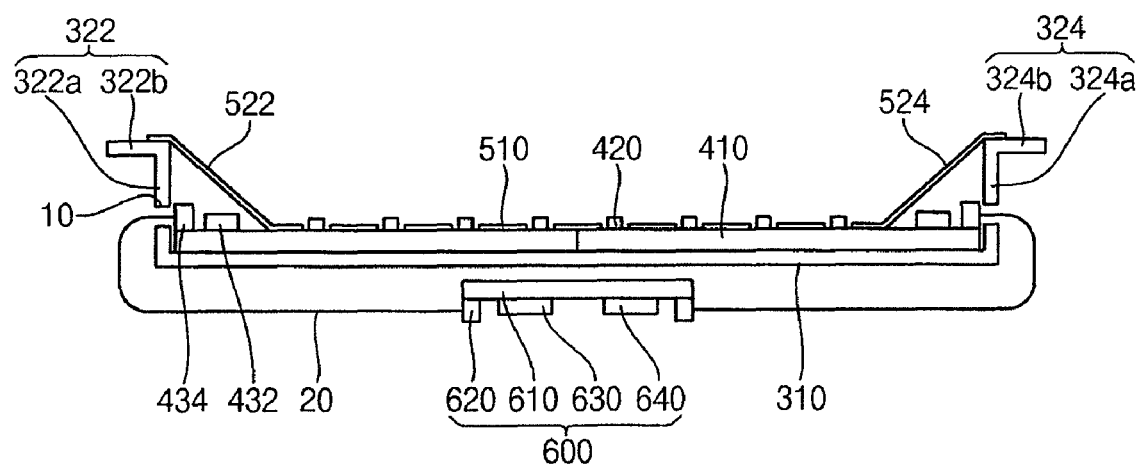
FIG. 9 is a cross-sectional view illustrating a backlight assembly of a display device according to yet another exemplary embodiment of the present invention.

FIG. 9 is a cross-sectional view illustrating a backlight assembly of a display device according to yet another exemplary embodiment of the present invention. The display device may have a structure and a function which are substantially similar to or substantially the same as those of the display device illustrated in FIGS. 1 to 6, except for sidewalls of a receiving container and a cover portion of a reflective sheet. Thus, the same or similar components will be referred to using the same reference numerals and any repetitive explanation will be omitted.

Referring to FIGS. 2 and 9, the sidewalls 320 may include a first sidewall 322 upwardly extending from the first end of the bottom plate 310, a second sidewall 324 upwardly extending from the second end of the bottom plate 310, a third sidewall 326 upwardly extending from the third end of the bottom plate 310, and a fourth sidewall 328 upwardly extending from the fourth end of the bottom plate 310. The optical member 200 illustrated in FIG. 1 may be disposed on upper surfaces of the sidewalls 320.

The first and second sidewalls 322 and 324 may extend in the first direction DI1 and be opposite to each other. The third and fourth sidewalls 326 and 328 may extend in the second direction DI2 and be opposite to each other.

At least one of the first to fourth sidewalls 322, 324, 326, and 328 may have a cross-section of a substantially 'L' shape or a substantially 'U' shape. For example, the first to fourth sidewalls 322, 324, 326, and 328 may have the cross-section of the substantially 'L' shape.

The first sidewall 322 having the cross-section of the substantially 'L' shape may include a first side part 322a and a first upper part 322b. The first side part 322a may upwardly extend from the first edge of the bottom plate 310. The first upper part 322b may outwardly extend from an upper edge of the first side part 322a with respect to the receiving space.

The second sidewall 324 having the cross-section of the substantially 'L' shape may include a second side part 324a and a second upper part 324b. The second side part 324a may upwardly extend from the second edge of the bottom plate 310. The second upper part 324b may outwardly extend from an upper edge of the second side part 324a with respect to the receiving space.

The third sidewall 326 having the cross-section of the substantially 'L' shape may include a third side part (not illustrated) and a third upper part (not illustrated). The third side part may upwardly extend from the third edge of the bottom plate 310. The third upper part may outwardly extend from an upper edge of the third side part with respect to the receiving space.

The fourth sidewall 328 having the cross-section of the substantially 'L' shape may include a fourth side part (not illustrated) and a third upper part (not illustrated). The fourth side part may upwardly extend from the third edge of the bottom plate 310. The fourth upper part may outwardly extend from an upper edge of the fourth side part with respect to the receiving space.

The cover portion 520 may extend from an end portion of the center portion 510. The cover portion 520 may be disposed over the peripheral region AR2 to cover the driving circuit 430. The cover portion 520 may include a first cover portion 522 corresponding to the first sidewall 322, a second cover portion 524 corresponding to the second sidewall 324, a third cover portion 526 corresponding to the third sidewall 326, and a fourth cover portion 528 corresponding to the fourth sidewall 328.

The first cover portion 522 may extend from the first end of the center portion 510 and include one end that is attached to the light-emitting region AR1 of the upper surface of the light-emitting substrate 410 and another end that is attached to an upper surface of the first upper part 322a of the first sidewall 322. Thus, the first cover portion 522 may cover the driving circuit that is disposed at the first peripheral region AR2 of the upper surface of the light-emitting substrate 410. The first cover portion 522 may be outwardly inclined with respect to the bottom plate 310 to improve the reflective efficiency of the light generated by the LEDs 420.

The second cover portion 524 may extend from the second end of the center portion 510 which is opposite to the first end of the center portion 510. The second cover portion 524 may have a structure and a function that are substantially similar to or substantially the same as the first cover portion 522, except that the second cover portion may be disposed over the second peripheral region AR2. Thus, any repetitive explanation concerning the second cover portion 524 will be omitted.

The third cover portion 526 may extend from the third end of the center portion 510 and include one end that is attached to the light-emitting region AR1 of the upper surface of the light-emitting substrate 410 and another end that is attached to an upper surface of the third upper part of the third sidewall 326. The third cover portion 526 may be outwardly inclined with respect to the bottom plate 310 to improve the reflective efficiency of the light generated by the LEDs 420.

The fourth cover portion 528 may extend from the fourth end of the center portion 510, which is opposite to the fourth end of the center portion 510. The fourth cover portion 528 may have a structure and a function that are substantially similar to or substantially the same as the third cover portion 526, except for a position of the fourth cover portion 528. Thus, any repetitive explanation concerning the fourth cover portion 528 will be omitted.

The upper surface of the light-emitting substrate 410 may further include a third peripheral region adjacent to the third sidewall 326 or a fourth peripheral region adjacent to the fourth sidewall 328. The third and fourth cover portions 526 and 528 may cover the driving circuits 430 disposed at the third and fourth peripheral regions.

According to at least one exemplary embodiment of the present invention, the cover portion may be attached to upper surfaces of upper parts that outwardly extend with respect to the receiving space to cover the driving circuit 430. Therefore, the backlight assembly may not need a side mold to cover the driving circuit and the manufacturing cost of the backlight assembly may be reduced.

According to exemplary embodiments of the present invention, a cover portion of a reflective sheet, which is connected to a center portion of the reflective sheet or separated from the center portion of the reflective sheet may be attached to an upper surface of an upper part of sidewalls or an inner side surface of the sidewalls. Thus, the cover portion of the reflective sheet may cover a driving circuit disposed in a peripheral region of the upper surface of a light-emitting substrate. Accordingly, a backlight assembly may not need a side mold to cover the driving circuit and the manufacturing cost of the backlight assembly may be reduced.

Although exemplary embodiments of the present invention have been described, those skilled in the art will readily appreciate that various modifications can be made without departing from the spirit and the scope of the disclosure. Accordingly, all such modifications are intended to be included within the scope of the present disclosure.

What is claimed is:

1. A backlight assembly comprising:
    a receiving container comprising a bottom plate and a sidewall upwardly extending from an edge portion of the bottom plate to form a receiving space;
    a light-generating unit comprising:
        a light-emitting substrate disposed in the receiving space, the light-emitting substrate including a light-emitting region and a peripheral region disposed outside of the light-emitting region;
        a plurality of light-emitting diodes (LEDs) disposed in the light-emitting region; and
        a driving circuit disposed in the peripheral region, the driving circuit controlling the LEDs; and
    a reflective sheet comprising:
        a center portion disposed on the light-emitting region, the center portion including a plurality of holes through which the LEDs respectively pass; and
        a cover portion disposed on the peripheral region to cover the driving circuit, the cover portion being attached to the sidewall,
    wherein the sidewall inwardly extends with respect to the receiving space to cover a portion of the driving circuit.

2. The backlight assembly of claim 1, wherein the cover portion is outwardly inclined with respect to the bottom plate.

3. The backlight assembly of claim 1, wherein the sidewall comprises:
a side part upwardly extending from the edge portion of the bottom plate; and
an upper part inwardly extending from an edge of the side part with respect to the receiving space,
wherein the cover portion is attached to the upper part.

4. The backlight assembly of claim 3, wherein the upper part covers at least a portion of the driving circuit.

5. The backlight assembly of claim 1, wherein the cover portion extends from an end of the center portion.

6. The backlight assembly of claim 1, wherein the cover portion is separated from the center portion and attached to the upper surface of the light-emitting substrate.

7. The backlight assembly of claim 6, wherein the cover portion comprises a metal to reflect light and has a fixed shape.

8. The backlight assembly of claim 1, wherein the bottom plate has a substantially rectangular plate shape, the sidewall comprises first to fourth sidewalls respectively corresponding to first to fourth sides of the bottom plate, and the cover portion comprises first to fourth cover portions respectively corresponding to the first to fourth sidewalls.

9. The backlight assembly of claim 8, wherein the driving circuit is disposed in the peripheral region adjacent to at least one of the first to fourth sidewalls, and at least one of the first to fourth cover portions corresponding to the at least one of the first to fourth sidewalls is disposed over the peripheral region to cover the driving circuit.

10. The backlight assembly of claim 1, wherein the driving circuit is disposed in the peripheral region and electrically connected to the LEDs, and comprises a current balancer controlling the LEDs to maintain current balance of currents applied to the LEDs.

11. The backlight assembly of claim 10, further comprising a control unit electrically connected to the driving circuit to control the driving circuit.

12. The backlight assembly of claim 11, wherein the driving circuit further comprises an inner connector disposed in the peripheral region and electrically connected to the control unit by a connecting line.

13. The backlight assembly of claim 12, wherein the sidewall comprises a through-hole through which the connecting line passes.

14. A display device comprising:
a display panel displaying an image using light; and
a backlight assembly disposed under the display panel to provide the display panel with the light, the backlight assembly comprising:
a receiving container comprising a bottom plate and a sidewall upwardly extending from an edge portion of the bottom plate to form a receiving space;
a light-generating unit comprising a light-emitting substrate disposed in the receiving space, the light-emitting substrate including a light-emitting region and a peripheral region disposed outside of the light-emitting region, a plurality of LEDs disposed in the light-emitting region and a driving circuit disposed in the peripheral region, the driving circuit controlling the LEDs;
a reflective sheet comprising a center portion disposed on the light-emitting region, the center portion including a plurality of holes through which the LEDs respectively pass and a cover portion disposed on the peripheral region to cover the driving circuit, the cover portion being attached to the sidewall,
wherein the sidewall inwardly extends with respect to the receiving space to cover a portion of the driving circuit.

15. The display device of claim 14, further comprising an optical member disposed between the display panel and the backlight assembly to improve optical properties of the light generated by the backlight assembly.

16. The display device of claim 15, wherein the receiving container further comprises at least one fixing protrusion protruding from an upper surface of the sidewall to fix the optical member supported by the upper surface of the sidewall.

17. The display device of claim 14, wherein the cover portion is outwardly inclined with respect to the bottom plate.

18. The display device of claim 17, wherein the sidewall comprises:
a side part upwardly extending from the edge portion of the bottom plate; and
an upper part inwardly extending from an edge of the side part with respect to the receiving space,
wherein the cover portion is attached to the upper part.

* * * * *